C. T. ZETTERVALL.
HORSESHOE.
APPLICATION FILED DEC. 20, 1911.

1,071,128.

Patented Aug. 26, 1913.

Witnesses:
Robert H. Weir
A. L. Halcutt

Inventor:
Carl T. Zettervall
By H. Sanders
Atty.

UNITED STATES PATENT OFFICE.

CARL T. ZETTERVALL, OF BRAINERD, MINNESOTA.

HORSESHOE.

1,071,128. Specification of Letters Patent. Patented Aug. 26, 1913.

Application filed December 20, 1911. Serial No. 667,015.

*To all whom it may concern:*

Be it known that I, CARL T. ZETTERVALL, a citizen of Sweden, residing at Brainerd, in the county of Crow Wing and State of Minnesota, have invented certain new and useful Improvements in Horseshoes, of which the following is a specification.

This invention relates to improvements in horseshoes and its object is to provide a device of this class that is made in two sections pivoted together and provided with a center plate to protect the horse's foot from injury.

The invention consists in the combination and arrangement of parts to be hereinafter fully described in the following specification, pointed out in the claim and illustrated in the accompanying drawing which forms a part of the specification and in which—

Figure 1:
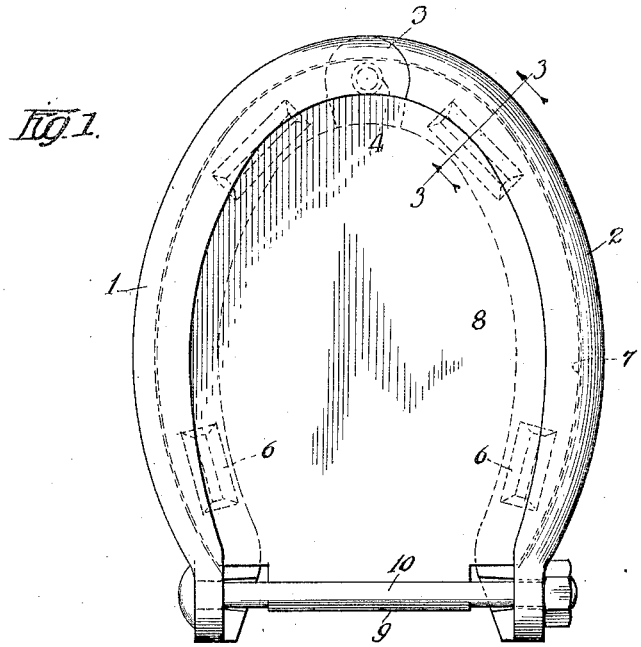
Figure 2:
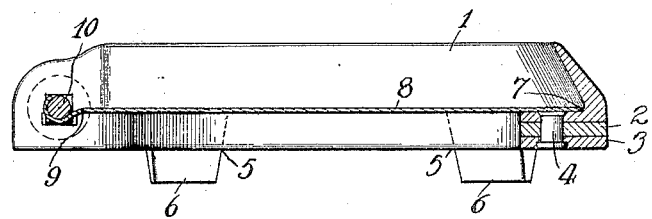
Figure 3:
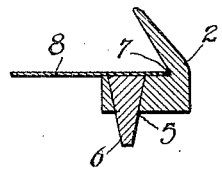

Figure 1 is a plan of the horseshoe. Fig. 2 is a section in side elevation. Fig. 3 is a section taken on line 3—3 of Fig. 1.

Like reference characters indicate corresponding parts throughout the several views.

My improved horseshoe is formed of two sections 1 and 2 mortised together as at 3 and mounted upon a pivot 4. Each section is provided with a plurality of wedge shaped apertures 5 for the reception of wedge-like calks 6. An annular recess 7 is formed in each section for the reception of a metallic center plate 8 that rests upon the calks 6, the rear end of this plate being formed with a depressed integral tongue 9 to receive a transverse bolt 10 that extends through the apertured ends of both sections of the horseshoe and through the medium of which bolt the sections are locked in operative position.

My horseshoe is readily secured upon or removed from a horse's foot, is adjustable to any size foot and is entirely nailless.

What is claimed is:—

In a horseshoe, coöperating sections pivotally connected each provided with a plurality of apertures and with an inner annular recess, calks wedged in the apertured portions of the said sections, a center plate seated in the recessed portions of the said sections terminating in an integral depressed tongue and a bolt disposed upon said tongue and connecting the rear terminations of the said coöperating sections whereby the same are locked in operative position.

In testimony that I claim the foregoing as my own I have hereto affixed my signature in the presence of two subscribing witnesses.

CARL T. ZETTERVALL.

Witnesses:
 GOTHFRED S. SWANSON,
 M. E. MANDERY.

---

Copies of this patent may be obtained for five cents each, by addressing the "Commissioner of Patents, Washington, D. C."